(12) United States Patent
Bloomenthal

(10) Patent No.: US 6,956,565 B2
(45) Date of Patent: Oct. 18, 2005

(54) METHOD TO COMPUTE THE MEDIAL AXIS/SURFACE OF A THREE-DIMENSIONAL OBJECT

(75) Inventor: Jules I. Bloomenthal, 432-24$^{th}$ Ave. East, Seattle, WA (US) 98112

(73) Assignee: Jules I. Bloomenthal, Seattle, WA (US)

( * ) Notice: Subject to any disclaimer, the term of this patent is extended or adjusted under 35 U.S.C. 154(b) by 118 days.

(21) Appl. No.: 10/136,816

(22) Filed: Apr. 30, 2002

(65) Prior Publication Data

US 2002/0158867 A1 Oct. 31, 2002

Related U.S. Application Data

(60) Provisional application No. 60/287,661, filed on Apr. 30, 2001.

(51) Int. Cl.$^7$ .............................................. G06T 15/00
(52) U.S. Cl. ...................... 345/419; 345/420; 345/423; 345/441; 345/442
(58) Field of Search ................................ 345/419, 420, 345/441, 442, 423, 473, 472

(56) References Cited

U.S. PATENT DOCUMENTS 6,100,893 A * 8/2000 Ensz et al. .................. 345/420

6,377,865 B1 * 4/2002 Edelsbrunner et al. ........ 700/98

OTHER PUBLICATIONS

Sheehy et al. "Computing the Medial Surface of a Solid from a Domain Delaunay Triangulation", ACM 1995, pp. 201–212.*
Sherbrooke et al. "Computation of the Medial Axis Transform of 3–D Polyhedra", ACM, 1995, pp. 187–199.*
Yu et al. "Constructing 3D Discrete Medial Axis", ACM 1991, pp. 481–489.*

* cited by examiner

*Primary Examiner*—Kimbinh T. Nguyen
(74) *Attorney, Agent, or Firm*—Black Lowe & Graham PLLC

(57) ABSTRACT

A system, method and computer program product for computing an approximation of the medial of a 3D object. The method retrieves a three-dimensional digital object, and approximates medial information based on direction vector information and three-dimensional space partitions. The three-dimensional space partitions include a plurality of tetrahedron. The medial information includes defining direction vector information for each corner of each of the plurality of tetrahedron. The direction vector information is based on a point location relative to a nearest surface of the three-dimensional digital object. The medial information further includes computing an approximation of at least of a manifold point, a non-manifold point, a axial point, or a vertex point.

12 Claims, 12 Drawing Sheets

METHOD TO COMPUTE THE MEDIAL AXIS/SURFACE OF A THREE-DIMENSIONAL OBJECT

PRIORITY CLAIM

This application claims priority from U.S. Provisional Application Ser. No. 60/287,661, filed Apr. 30, 2001.

FIELD OF THE INVENTION

This invention relates generally to computer graphics and, more specifically, to three-dimensional geometric modeling as well as finite element analysis.

BACKGROUND OF THE INVENTION

The medial of a 3D object is the set of points in 3D space that form the centers of maximally-sized spheres contained completely within the object and touching the object at two or more distinct points. The medial is a geometric entity of interest to engineering and animation disciplines.

Existing methods to compute the medial suffer from 1) loss of accuracy due to an iterative accumulation of error, or 2) logical errors that arise from the complexity of tracing or combinatoric schemes.

In finite element analysis, researchers have postulated the value of the medial as a means to automate the division of a 3D object into 'mesh' elements, but have failed to develop an adequate description for the medial.

In character animation, researchers have sought to improve the ease of control of 3D objects during animation, but have been frustrated in their progress because of a reliance on a 'stick-figure' skeleton as a control mechanism.

Therefore, there exists a need for a better tool for use in finite element analysis and character animation.

SUMMARY OF THE INVENTION

The present invention includes a system, method and computer program product for approximating the medial of a 3D object. The method retrieves a three-dimensional digital object, and generates medial information based on direction vector information and three-dimensional space partitions, such as cubes.

In accordance with further aspects of the invention, partitioning includes a plurality of tetrahedra. Computing medial information includes defining direction vector information for each corner of each of the plurality of tetrahedra.

In accordance with other aspects of the invention, the direction vector information is based on a point's location relative to a nearest point on the surface of the three-dimensional digital object.

In accordance with still further aspects of the invention, approximating medial information includes computing an approximation of at least one of a manifold point, a non-manifold point, an axial point, or a boundary point.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 3:
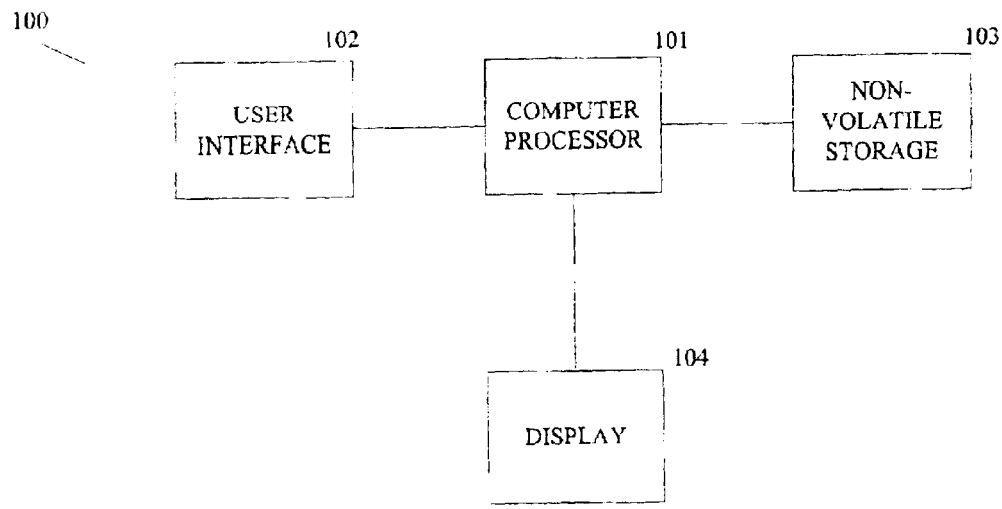
FIG. 3 depicts a computer system.

FIG. 3 illustrates a system 100 that performs a three-dimensional (3D) object medial determination in accordance with the present invention. The system 100 includes a computer processor 101 that is connected to a user interface 102, non-volatile storage 103, and a display 104.

Figure 4:
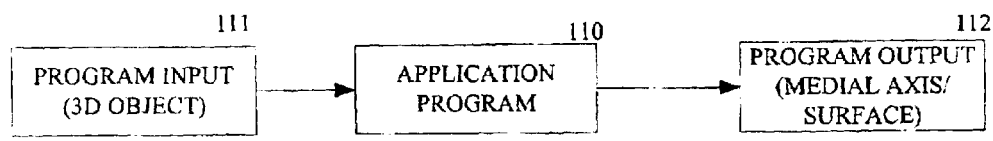
FIG. 4 depicts an application program within the computer processor.

FIG. 4 shows an application program 110 that runs inside the computer processor 101. The user interface 102 controls the application program 110 and the display 104 displays program results. The non-volatile storage 103 allows the application program 110 to access input data and provides a place for the application program to store output.

The program 110 reads input from non-volatile storage 103 or some other external storage location in the form of any of several standard digital representations of a 3D object 111. The program 110 calculates medial information 112 for the 3D object 111, and saves the medial information 112 in the storage 103.

Figure 1:
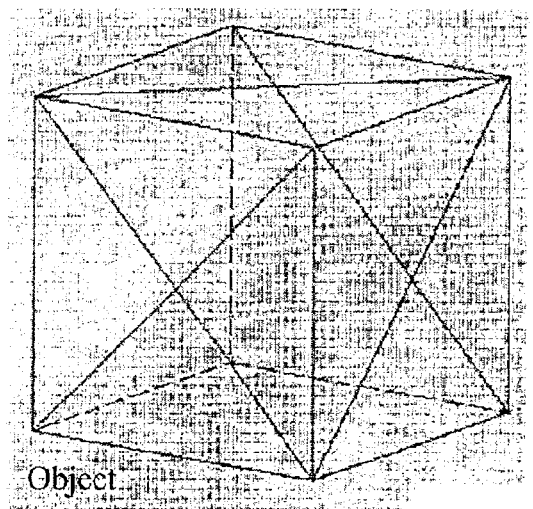
FIGS. 1 and 2 illustrate examples of prior art three-dimensionally described objects.
Figure 2:
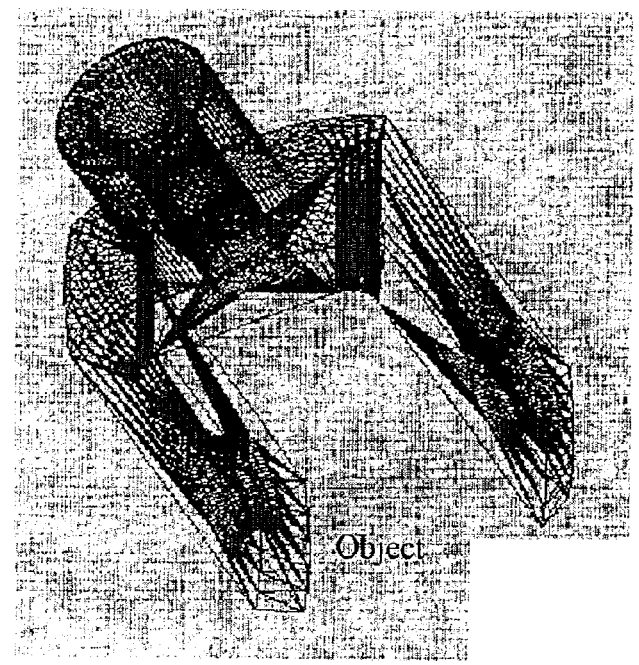
Figure 5:
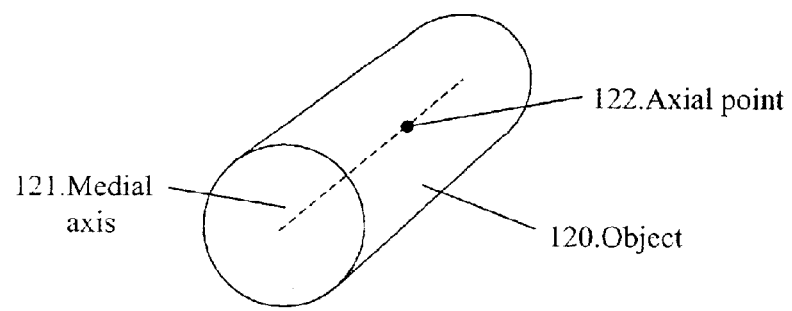
FIG. 5 depicts a cylindrical object and the corresponding medial axis.
Figure 6:
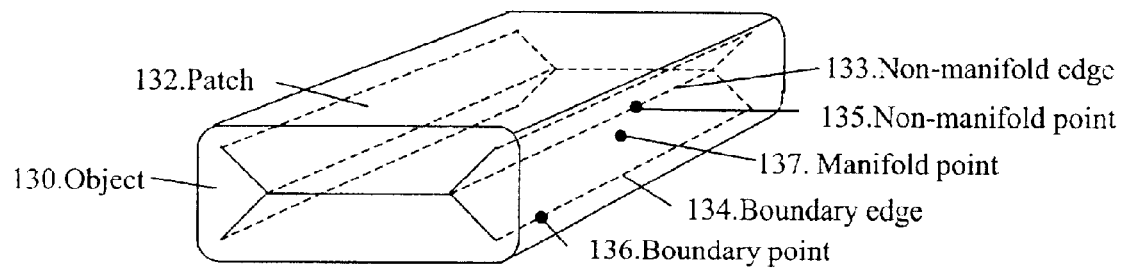
FIG. 6 depicts a rounded-edge object and the corresponding medial surface.

FIGS. 5 and 6 illustrate example medials for different 3D objects, see FIGS. 1 and 2. The medial is a collection of one or more points, lines, and/or planar surfaces that defines a center point, a center line or a center surface of a 3D object. A cylindrical object 120 or that part of an object that is cylindrical has a medial that is a line (axis 121). More complex objects, such as object 130, include a number of surface patches 132 that define the medial. A sphere has a point for a medial. Axes are associated with cylindrically-shaped parts of an object and surface patches are associated with noncylindrically-shaped parts of the object. Surface patches connect along non-manifold edges, e.g. edge 133, and terminate along boundary edges, e.g. edge 134.

Points on the medial 112 are defined in different ways. For example, as shown in FIG. 5, a point on the medial axis is an axial point 122. As shown in FIG. 6, a point on a non-manifold edge 133 is a non-manifold point 135, and a point on a boundary edge 134 is a boundary point 136. All other medial points on patches are manifold points 137.

The program 110 generates an approximation to an object's medial. The program 110 represents the medial as a collection of axial points 122 (FIG. 5), manifold points 137, non-manifold points 135, or boundary points 136 (FIG. 6). The program 110 also provides inter-point connectivity information in the form of triangles for defining a patch (i.e., triplets of indices into the point array) and line segments (i.e., pairs of indices into the point array). The points, triangles, and segments are the outputted medial information 112 of the program 110 and represent the axes 121 and patches 132 that constitute the medial.

The points, triangles, and segments represent the axes 121 and patches 132 that constitute the medial. The program 110 produces the points, triangles and segments as output to non-volatile storage 103 as the outputted medial information 112.

Figure 8:
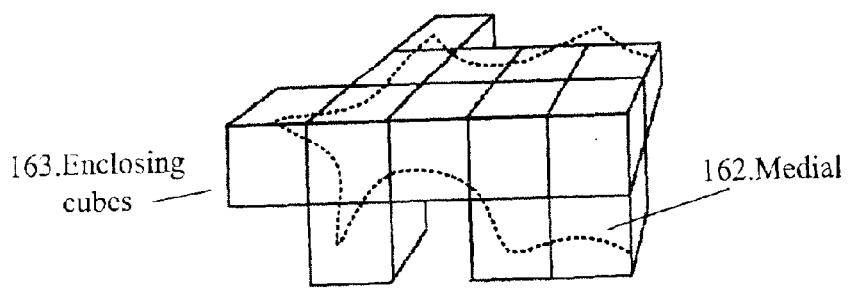
FIG. 8 depicts the medial enclosed by cubes.

The points, triangles and segments are determined through a process of numerical continuation outlined in FIG. 8. 3D cubes are generated based on footpoint direction vector information associated with each corner of the cube (see FIG. 14) Within each cube the medial intersection with the cube is approximated and stored for output.

Figure 9:
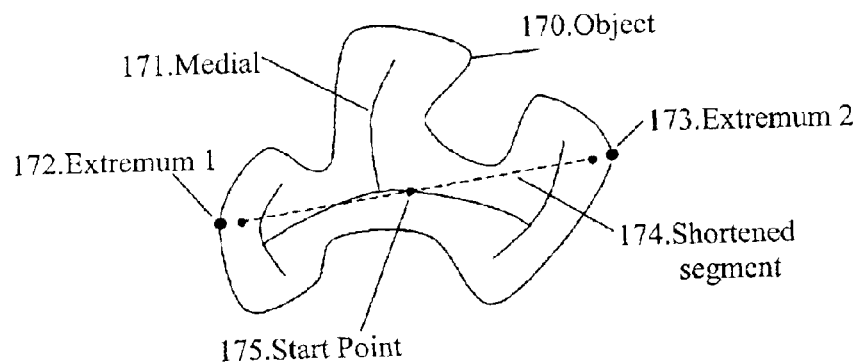
FIG. 9 depicts the locating of an arbitrary point on the medial.

A 3D object occupies a defined volume and location in 3D space defined by X, Y, Z axes. First, at step 141, a single medial point is found to serve as a start point, such as a point 175 on a medial of an object 170 as shown in FIG. 9. In one embodiment, this is done by first finding extrema points 172, 173 of the object in the X-direction (i.e., the point on the object with minimum X-value, and the point with maximum X-value). A segment 174 between the extrema points 172, 173 is searched for a medial point using a method described below in the section titled Computing Medial Points Along a Segment.

At steps 142, 143, an initial cube is created as described below in the Cube Creation section. The cube is preferably centered on the start point and squared against a coordinate system that describes the object. This initial cube is placed on an initially empty stack in memory associated with the program 110. The information stored for a cube includes an (i,j,k) identifier for each of the eight corners based on a (0,0,0) or other default value that is used to identify one of the corners of the initial cube. The stored cube information also includes a direction vector for each of the eight corners. The direction vector points to the nearest surface point of the 3D object and is determined according to analysis of the corner's location relative to the object's surface based on the inputted 3D object information.

At step 144-146, the stack is checked for content (step 144) and, if not empty, a cube is popped from the top of the stack (step 146) and is sent for processing (steps 147-150). During the processing the stack may grow, but eventually (as the entire medial is enclosed in cubes, as shown in FIG. 8) it shrinks to zero size, at which time the program 110 exits (step 145).

Figure 10A:
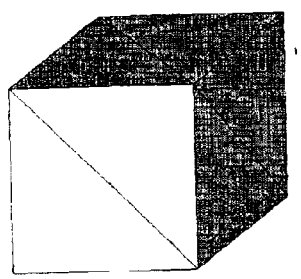
FIGS. 10A and B depict the decomposition of a cube into tetrahedra.
Figure 10B:
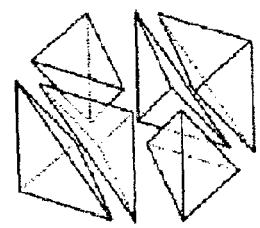

At step 147, the cube is decomposed into six tetrahedra preferably using only the existing cube corners (FIG. 10A and B). That is, six sets of four corners may be obtained from the cube such that the resulting six tetrahedra fully occupy the cube. Each set of four corners is processed as an individual tetrahedron. In an alternate embodiment the cube is decomposed into five tetrahedra.

At step 148, the tetrahedron is processed for generating a geometric approximation of the medial, as described in more detail below in FIG. 13 and the section Processing of Tetrahedra. Intersections of the medial with the edges and faces of the cube are computed.

At step 149, 150, for each face of the cube that intersects the medial, the cube location across the face from the 'current' cube is tested to see whether a cube has been previously computed at that location. If it has not, a new cube is created and pushed onto the stack. The process then returns to step 144 until the stack is free of cubes.

Internal Data Representation

During the processing of each cube, data associated with the corners and edges of the cube and the edges and faces of the tetrahedra are needed, often repeatedly. The present embodiment employs a sparse 3D storage scheme so that previously computed data is accessed from memory rather than recomputed.

Figure 14:
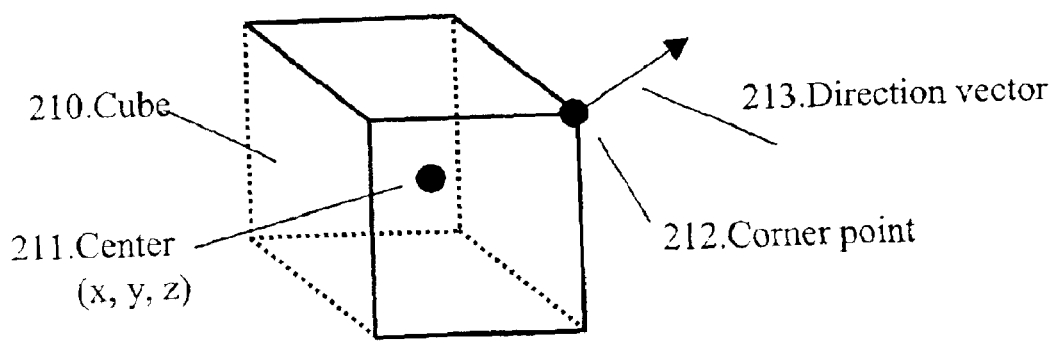
FIG. 14 depicts the creation of a cube.

As shown in FIG. 14, data defining a cube corner includes a direction vector 213. Because the cubes align with the coordinate system, each cube corner is preferably identified by a three integer triplet (i,j,k) identifier corresponding to the position of one of the cube's corners in the X, Y, and Z directions. A cube corner is identified with an (i,j,k) identifier, a cube edge has two (i,j,k) identifiers, and a tetrahedron face is identified with three (i,j,k) identifiers.

Figure 7:
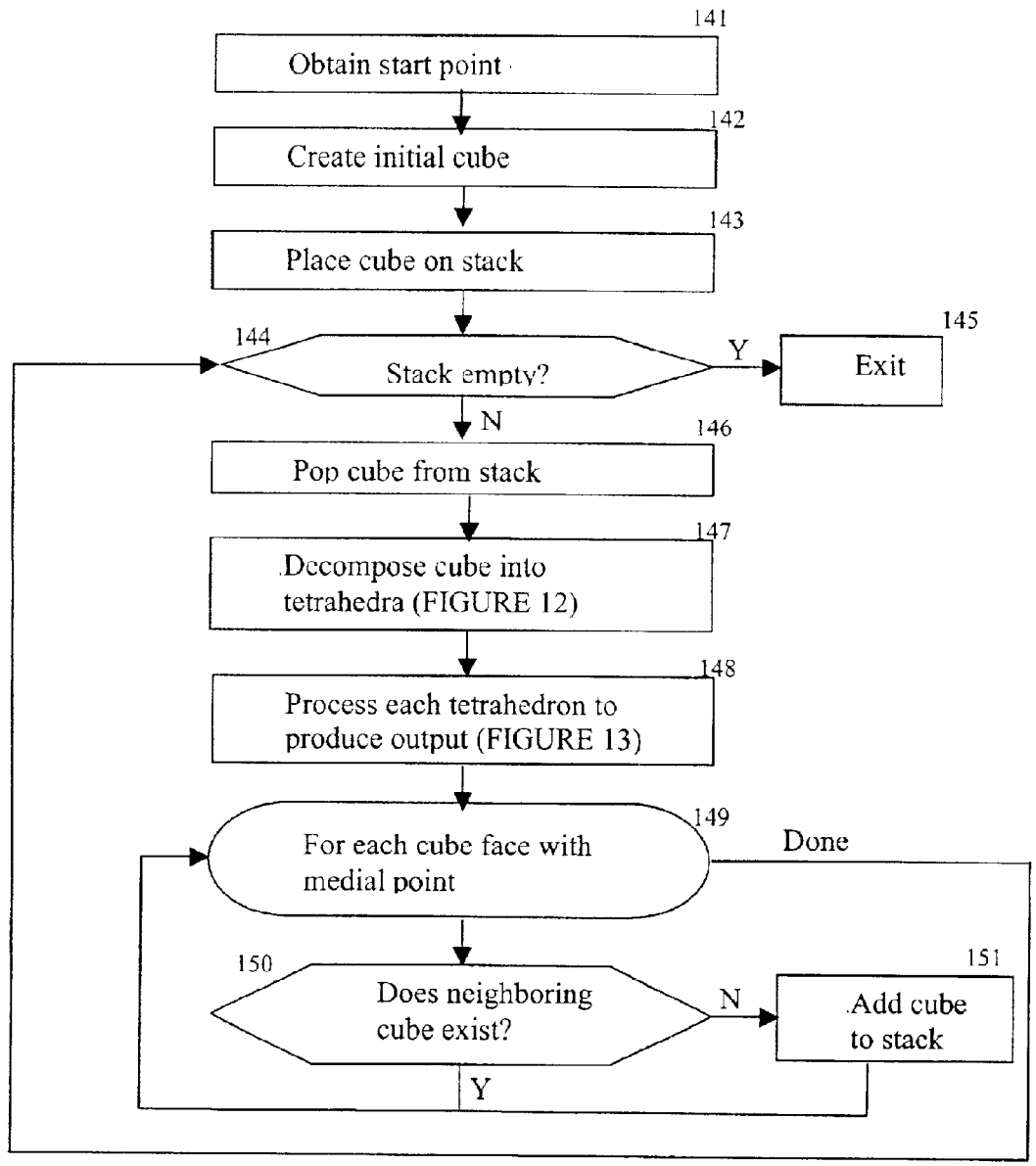
FIG. 7 depicts the numerical continuation process.

These identifiers are used in a hash table whereby corner, edge, and face data are stored in linear arrays, indexed by a number computed by hashing the (i,j,k) identifiers, which also serve as keys to properly identify the records stored in the array Use of a Stack Each cube is not completely processed (i.e., no points or triangles are produced) when it is newly created, because any new points created during the processing would result in one or more additional cubes being created, with subsequent processing. This recursion rapidly depletes the allowable depth of subroutine nesting permitted on average computers. For this reason, new cubes are placed on a stack (step 143, FIG. 7), rather than processed through subroutine recursion After the initial cube is placed on the stack, cubes are 'popped' from the top of the stack until the stack is empty.

Each cube popped from the stack is processed, producing medial information in the form of points, triangles and/or segments.

The stack of cubes is implemented as a linear array of pointers to cube records in memory of the program 110.

Computing Medial Points Along a Segment

Figure 11:
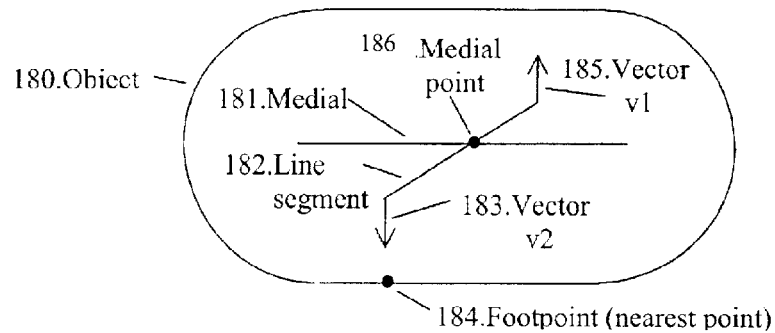
FIG. 11 depicts the conditions when a line segment is tested for intersection with the medial.

A line segment is first tested to determine whether its endpoint conditions suggest intersection with the medial. Referring to FIG. 11, direction vectors v1 185 and v2 183 are associated with endpoints of a line segment 182 and point towards the nearest point (called the 'footpoint') on an edge 180 of the object.

A footpoint 184 is computed using an octree that previously recursively subdivided a rectilinear volume that bounds the object into sub-volumes. Each sub-volume is associated with a list of object parts (typically, triangles) that potentially are the closest in distance to any point within the sub-volume. For a point within a given sub-volume, the object parts on an associated object list are each tested and the nearest point on the object boundary is found.

Figure 12:
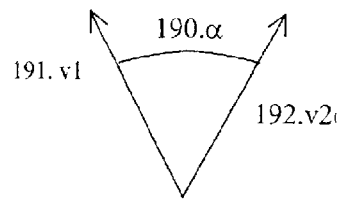
FIG. 12 depicts the angle between two vectors.

As shown in FIGS. 11 and 12, a line segment 182 potentially intersects the medial as long as an angle $\alpha$ 190 between the vectors v1 185 and v2 183 exceeds some threshold value (e.g., 30 degrees). The test of $\alpha$ is implemented as the equivalent test of whether the dot-product of v1 and v2 (i.e., the cosine of the angle) exceeds some lower limit. v1 and v2 are both presumed to be of a unit-length.

Figure 13:
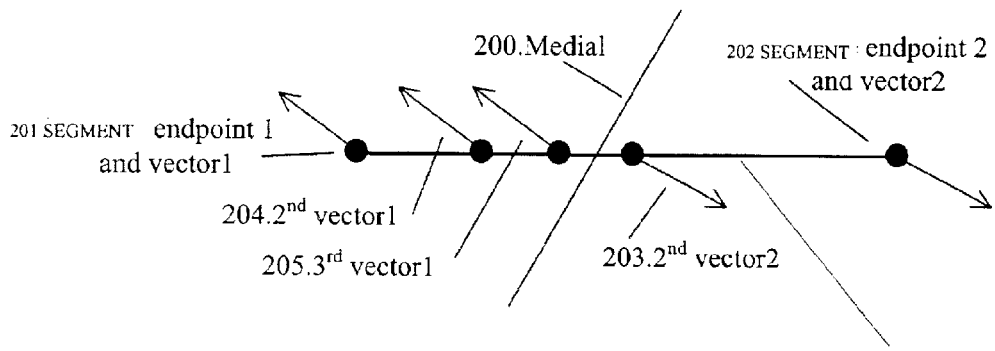
FIG. 13 depicts binary subdivision of a line segment.

FIG. 13 illustrates binary subdivision of a line segment 182 to compute the point of intersection 186 with a medial 200. The medial 200 separates the line segment 182 into two regions. Points on the line segment 182 that belong to one region have parallel (or near-parallel) direction vectors. Points that belong to the other region have different, but mutually parallel, direction vectors. A medial point 186 where the direction vectors change direction is found by performing a binary subdivision of the line 182. This point is characterized by a "v1v2 orientation", i.e., a vector belonging to the first region, and one belonging to the second region. A first subdivision point, a midpoint between left and right endpoints, has a vector 203 parallel to the vector 202 of the right endpoint. A new 'active' segment is determined by replacing the right endpoint with the first subdivision point. The midpoint of the new segment between the left endpoint and the first subdivision point is a second subdivision point, which has a vector 204 parallel to that of the left endpoint. Therefore, the second subdivision point replaces the left endpoint. The new 'active' segment is between the first and second subdivision points. This process continues for a fixed number of subdivisions, whereby the midpoint is reached. The midpoint of the final active segment is taken as the medial point.

Cube Creation

FIG. 14 depicts the creation of a cube of size 2Δ, centered at some arbitrary location (x,y,z). Corners are located at (x±Δ, y±Δ, z±Δ). At each corner a direction vector to the nearest point on the object is computed. The cube is placed on the stack; not until it is removed from the stack is it processed as follows.

Processing of Tetrahedra

Figure 15:
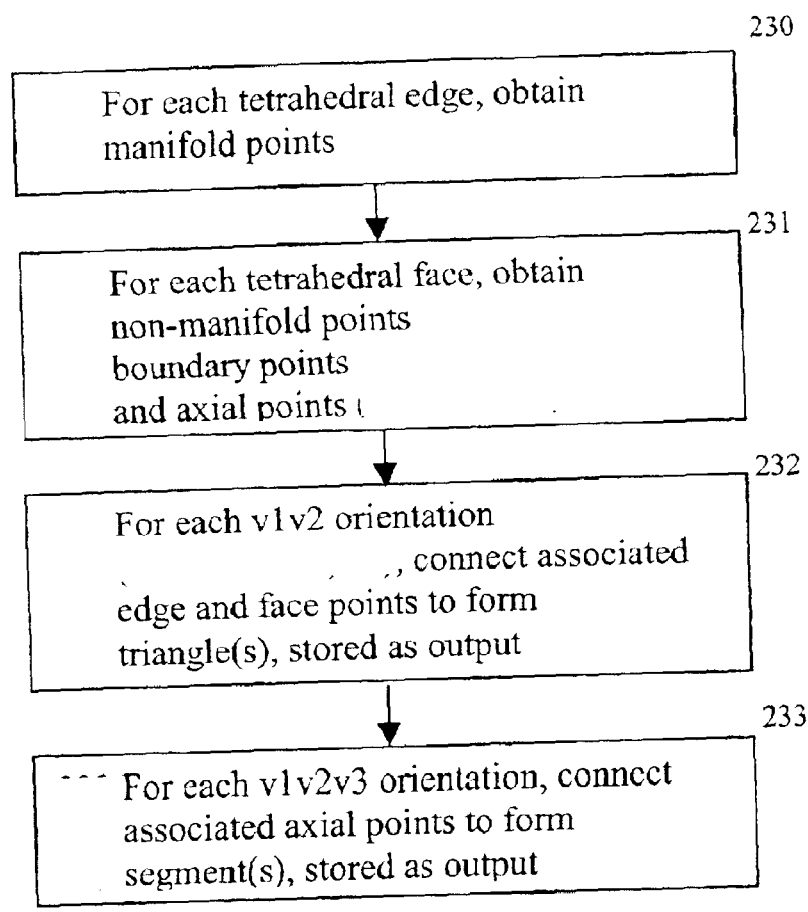
FIG. 15 outlines the processing of each tetrahedron.

FIG. 15 shows the steps for processing of tetrahedra. At step 230, each of the six edges of each tetrahedron is tested for the presence of one or more manifold points. Medial points previously computed on a tetrahedral edge are accessed from memory using a sparse 3D storage scheme; otherwise the points are computed per the edge subdivision process described above (FIGS. 11–13). At step 231, each of the four faces of the tetrahedron is tested for the presence of one or more boundary points, non-manifold points, and/or axial points. Medial points previously computed for a tetrahedron face are accessed from memory using a sparse 3D storage scheme, otherwise non-manifold points and boundary points are computed per a contour following scheme described below, and axial points are computed per an axial location scheme described below.

At step 232, the manifold, boundary, and non-manifold points detected within a tetrahedron are connected to form one or more triangles. At step 233, detected axial vertices are connected to form one or more line segments.

Contour Following

Figure 16:
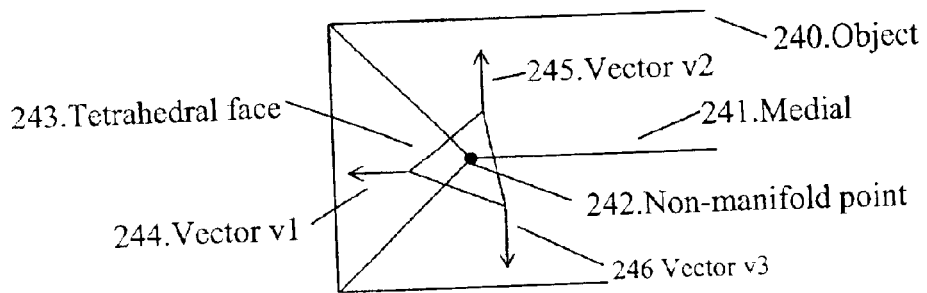
FIG. 16 depicts a non-manifold point within a tetrahedron face.
Figure 17:
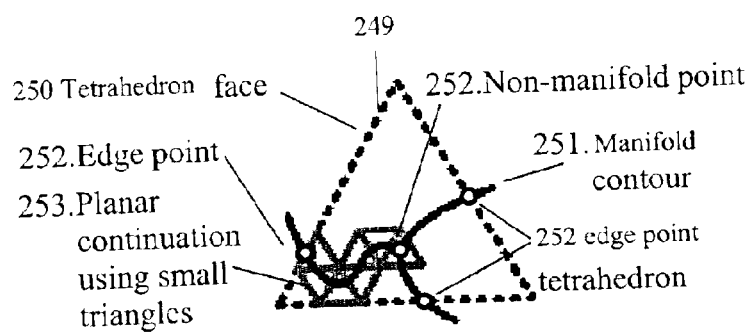
FIGS. 17 and 18 depict contour-following within a tetrahedral face.
Figure 18:
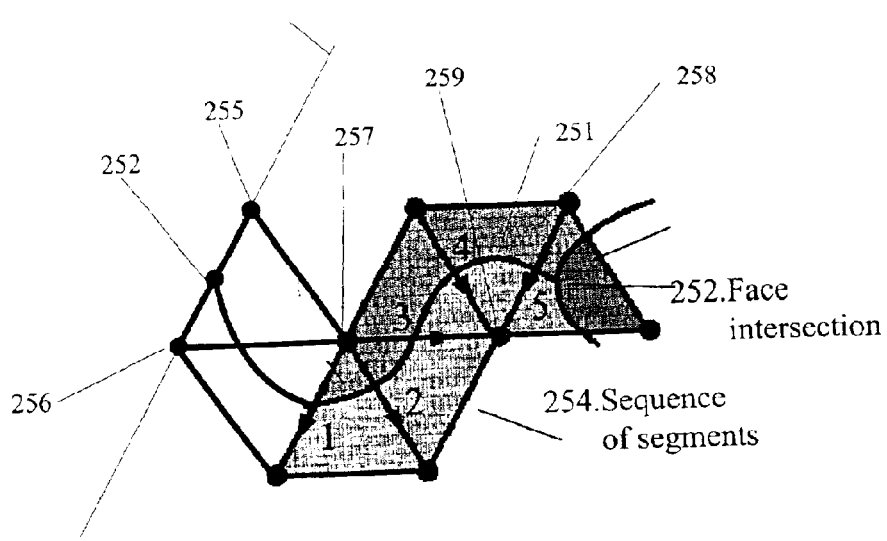

Each tetrahedron face is examined to determine if the face (not an edge of the face) includes one or more non-manifold points or one or more boundary points. If the direction vectors at the three corners of a face are all mutually divergent by an angular threshold amount, a non-manifold point is indicated and is found using contour following. Also, three divergent direction vectors indicate that a manifold point is present on each of the tetrahedron edges. As shown in FIGS. 16–18, a non-manifold point 242 is situated within a tetrahedron face 243 and must be found. The face 243 includes direction vectors 244–246 at the three corners of the face 243. The vectors 244–246 are all mutually divergent, which invokes a contour following scheme, as follows.

Referring to FIG. 17, the contour follower scheme begins at one of the three previously determined edge intersections of a tetrahedron face 250, and finds the medial manifold contour 251 by constructing triangles smaller than the face 250 until the intersection (the non-manifold point 252) is found.

FIG. 18 depicts small triangles (1–5) that are created in the contour following process for locating or approximating the non-manifold point 259. The first small triangle is started at one of the predetermined edge intersection points. First, two points 255, 256 are selected from a starting edge 249 at some predetermined distance on opposite sides of an edge intersection point 252. A third point 257 is chosen from within the face 250 based on a predefined small triangle shape and size. The small triangle shape is preferably the same shape type triangle as the face. Then, direction vectors for the three corners of the small triangle are determined and then compared. If the direction vector of the third point 257 and the direction vector for point 255 diverge from the direction vector of point 256 but not each other, the medial manifold contour 251 must pass between points 256 and 257. Therefore, a new small triangle is created with one side matching the edge between points 256, 257.

If the direction vectors for all three corners of a small triangle diverge from each other by some threshold amount, the medial crosses all the edges of the small triangle. If this occurs, a non-manifold point exists within and the contour following process stops for the face. Contour following is re-applied to the final triangle 258 that contains the non-manifold point, if it is desired to more accurately define the location of the non-manifold point.

Figure 19:
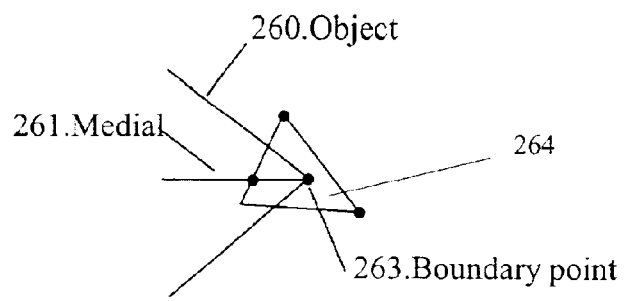
FIG. 19 depicts a tetrahedron face with boundary point, object creased.

The contour following process described is further used to detect boundary points. The conditions for a boundary point are different than those for a non-manifold point. There are two distinct conditions under which a boundary point is found within a tetrahedral face. In both cases the boundary point is found by invoking the contour follower from the one face edge that contains an intersection with the medial. The first case occurs along a convex crease of an object 260, such as depicted in FIG. 19, where a tetrahedron face 264 contains a boundary point 263 of a medial 261, two of the corners of the face 264 are outside the object 260. Thus, the medial 261 intersects one edge of the face 264. From this edge intersection the medial contour is followed to the boundary point 263 on the edge of the object 260.

Figure 20:
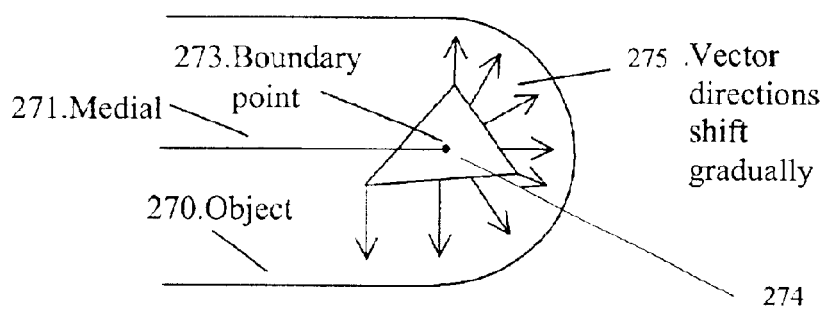
FIG. 20 depicts a tetrahedron face with boundary point, object rounded.

The second case occurs at the center of radius of a rounded object 270, such as depicted in FIG. 20. A tetrahedron face 274 contains a single edge/medial intersection 35 and all the tetrahedron face corners are within the object 270 but the direction vectors 275 shift direction gradually along two of the tetrahedron face edges, indicating the object 270 is locally round. From the edge intersection the contour is followed to the center of curvature (i.e., boundary point).

Figure 21:
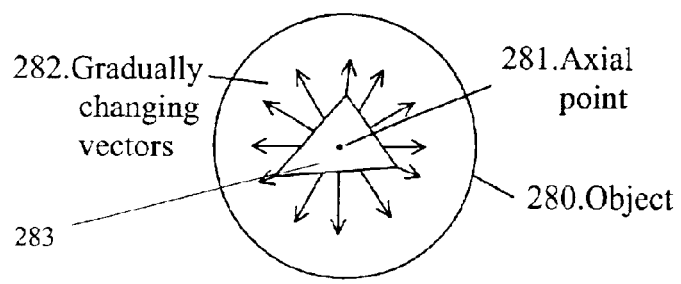
FIG. 21 depicts a tetrahedron face with axial point.
Figure 22:
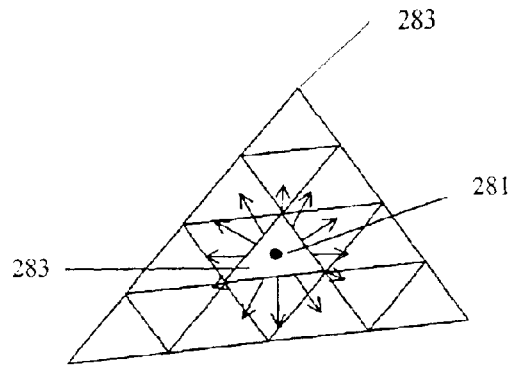
FIG. 22 depicts the subdivision of the face with axial point.

Detection of an axial point 281 within a tetrahedron face 283 is depicted in FIG. 21. The three direction vectors at the tetrahedron face corners are mutually distinct, but along each edge the shift of direction vector is gradual and thus no face edge intersections exist. In such a case the face 283 is recursively subdivided to approximate the axial point 281, see FIG. 22.

Triangle Formation

Once all edge and face intersections for a tetrahedron have been found, the intersections are connected together to form triangles. The connections are made between points with similar v1v2 orientations.

Figure 23:
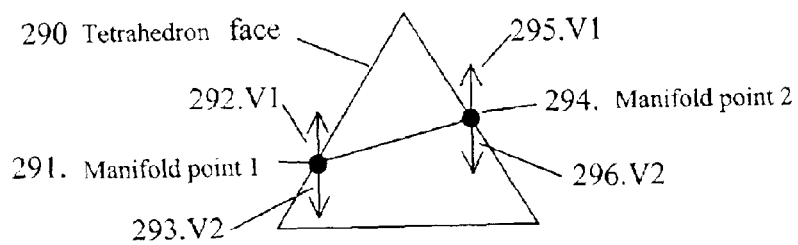
FIG. 23 depicts the connection of two edge intersections.

FIG. 23 depicts a tetrahedron face 290 containing two edge intersections of a medial at points 291 and 294. Because the intersection points 291, 294 have similar orientations of their vectors v1v2, they are connected together. A manifold section of the medial that passes completely through a tetrahedron will intersect three or four edges. If there are three edge intersections, three tetrahedron faces are sliced by the medial and a triangle is produced. If there are four edge intersections, four faces are sliced and a quadrilateral (or two triangles) is produced.

Figures 24A, 24B:
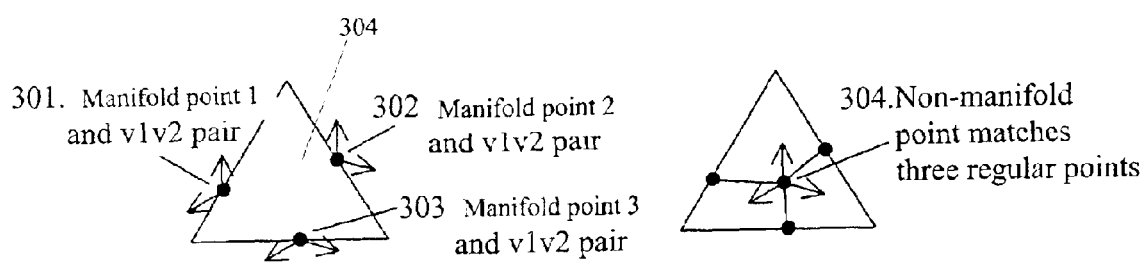
FIG. 24 depicts the connection of three edge intersections and a face intersection.

FIG. 24A depicts a tetrahedron face 300 with three edge intersections and a non-manifold face point. The v1v2 orientations associated with the edge intersections are mutually incompatible, but do correspond with the three vectors associated with the non-manifold point, see FIG. 24B. Thus, each of the three edge intersections is connected to the non-manifold point.

After all connections (edge to edge, and edge to face) are established for all four faces of a tetrahedron, triangles are computed and outputted.

The implementation supports multiple intersections per edge and multiple intersections per face. Thus, for example, the intersection of a medial patch at two boundary points within a single tetrahedron face is supported.

Figure 26:
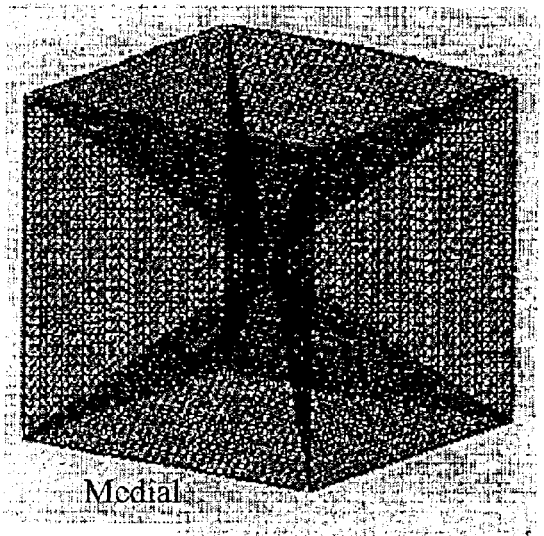
FIGS. 26 and 27 illustrate three-dimensional objects with medials determined in accordance with the present invention.
Figure 27:
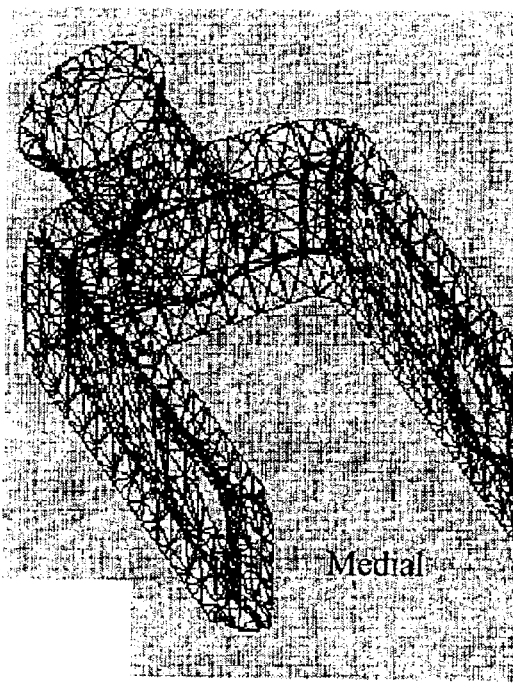

FIGS. 26 and 27 illustrate the medials for the three-dimensional objects shown in FIGS. 1 and 2.

Other Embodiments

Convex polyhedron (or combination thereof) may be used in place of a cube, in particular a tetrahedron, although this would complicate the sparse 3D storage scheme.

In the present implementation the cubes are aligned with the coordinate system, which simplifies some computation, but this need not be so.

Although an octree is employed to accelerate the computation of the footpoints, other optimization methods may be used, or none may be used.

Although the implementation supports multiple edge and face intersections, alternate embodiments, at some loss of accuracy, need not support such multiplicity.

Figure 25:
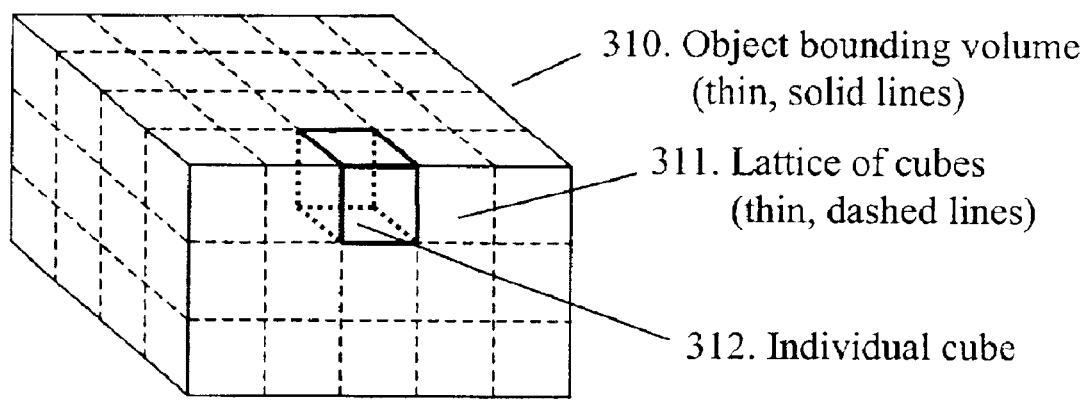
FIG. 25 depicts the exhaustive enumeration alternative to numerical continuation.

An exhaustive enumeration of all cubes within a volume may be performed, see FIG. 25. This is slower but simpler to implement.

It can be appreciated that schemes other than the stack presently used can be implemented.

Although the contour follower is implemented with a second level of accuracy, alternative strategies, including no increased accuracy, may also be employed.

Numerous other methods can be used to locate a start point, including random search and tests near highly curved parts of the object.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A medial approximating method comprising:

retrieving a three-dimensional digital object; and approximating medial information internal to the object based on direction vector information and three-dimensional space partitions, wherein the three-dimensional space partitions include a plurality of tetrahedral and wherein the direction vector information is based on a point on an edge of one of the plurality of tetrahedral relative to a nearest point on the surface of the three-dimensional digital object.

2. The medial approximating method of claim 1, wherein approximating medial information includes defining direction vector information for each corner of each of the plurality of tetrahedra.

3. The medial approximating method of claim 1, wherein approximating medial information includes computing an approximation of at least one of a manifold point, a non-manifold point, or an axial point.

4. A computer program product for approximating a medial for a three-dimensional digital object, the product comprising:

a means for retrieving a three-dimensional digital object; and a means for approximating medial information for the retrieved three-dimensional digital object and internal to the object based on direction vector information and three-dimensional space partitions, wherein the three-dimensional space partitions include a plurality of tetrahedral and wherein the direction vector information is based on a point on an edge of one of the plurality of tetrahedral relative to a nearest point on the surface of the three-dimensional digital object.

5. The computer program product of claim 4, wherein means for approximating medial information includes a means for defining direction vector information for each corner of each of the plurality of tetrahedra.

6. The computer program product of claim 4, wherein a means approximating medial information includes a means for computing an approximation of at least one of a manifold point, a non-manifold point, or an axial point.

7. A system for approximating a medial for a three-dimensional digital object, the system comprising:

memory for storing a three-dimensional digital object; and a processor for approximating medial information for the stored three-dimensional digital object and internal to the object based on direction vector information and three-dimensional space partitions, wherein the three-dimensional space partitions include a plurality of tetrahedral and wherein the direction vector information is based on a point on an edge of one of the plurality of tetrahedral relative to a nearest point an the surface of the three-dimensional digital object.

8. The system of claim 7, wherein the processor determines direction vector information for each corner of each of the plurality of tetrahedra.

9. The system of claim 7, wherein the processor computes an approximation of at least one of a manifold point, a non-manifold point, or an axial point.

10. A method of defining the medial of the three-dimensional digital object performed by a computer systems the method comprising:

defining one or more cubes around at least a portion of an approximate location for a medial of a three-dimensional digital object, wherein the one or more cubes include vertices having a three-dimensional location value partitioning the one or more cubes into a plurality of tetrahedra having corners;

determining edges of the tetrahedra that intersect the medial of the three-dimensional digital object based on the direction vectors of the associated tetrahedral corners;

identifying a point on one or more of the edges determined to be the intersection between the edge and the medial; and defining the medial of the three-dimensional digital object by identifying medial surfaces within the plurality of tetrahedra based on the identified points and a plurality of direction vectors, wherein the direction vectors are vectors from the identified points to a nearest point on the surface of the three dimesional digital object.

11. The method of claim 10, wherein identifying comprises subdividing the edge.

12. The method of claim 10, wherein identifying includes approximating the point on one or more of the edges determined to be the intersection between the edge and the medial.

\* \* \* \* \*